Patented Oct. 16, 1945

2,386,869

UNITED STATES PATENT OFFICE 2,386,869

MANUFACTURE OF 1.2.3.4-TETRAZOLE COMPOUNDS

John David Kendall, Ilford, England, assignor to Ilford Limited, Ilford, England, a British company No Drawing. Application December 11, 1944, Serial No. 567,789. In Great Britain August 27, 1943

10 Claims. (Cl. 260—308)

This invention relates to the manufacture of organic compounds and particularly to the manufacture of 1.2.3.4-tetrazole compounds, containing a hydrocarbon substituent in the 1-position and a mercapto group in the 5-position, and tautomers thereof.

The compounds with which this invention is concerned have the following tautomeric formulae (I):

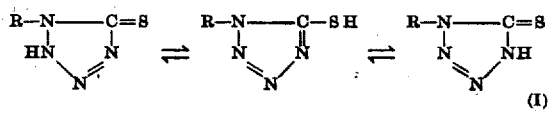

where R is a substituted or unsubstituted hydrocarbon group, and the invention is also concerned with the production of the alkali metal salts of such compounds.

A known method of making such compounds consists in reacting a mustard oil of the formula R.NCS (R having the significance given above) with sodium azide. However, the mustard oils are difficult to prepare and are expensive.

According to the present invention alkali metal salts of compounds of the tautomeric formulae (I) are prepared by reacting a dithiocarbamic ester containing a hydrocarbon or substituted hydrocarbon substituent on the nitrogen atom (i. e. a compound of the general formula R.NH.CSSR$_1$ wherein R and R$_1$ are each substituted or unsubstituted hydrocarbon groups) with an alkali metal azide, e. g. sodium azide. According to a further feature of the invention compounds of the tautomeric formulae (I) are prepared by acidifying solutions of the said alkali metal salts and separating the free tetrazole compounds.

The reaction has been found to be of quite general application. The group R can be an alkyl, aryl, aralkyl or cycloaliphatic group, e. g. a methyl, ethyl or higher alkyl group, a benzyl or naphthylmethyl group, a phenyl, naphthyl or di-phenyl group, or a cyclopentanyl or cyclohexanyl group. Such groups may themselves contain substituents, for example halogen atoms, nitro, amino, substituted amino, hydroxy, alkoxy and oxyalkyl groups.

In the course of the reaction a mercaptan R$_1$SH is split out and this forms a valuable by-product for use in other processes. Since the group R$_1$ does not occur in the product its precise nature is immaterial, and though it may be any of those referred to above in connection with the group R, it is preferred from the point of view of ease of reaction and simplicity in preparing the thiocarbamic ester intermediate that it should be a lower alkyl group and preferably a methyl group.

The thiocarbamic ester intermediate is readily prepared by reacting a suitable amine of the formula R.NH$_2$ with carbon disulphide in the presence of a strong base yielding, for example where caustic soda is used, a product of the formula R.NH.CSSNa, and then treating this with an ester R$_1$X where X is the residue of a strong acid, for example a mineral acid or p-toluene sulphonic acid, whereby the desired intermediate of formula R.NH.CSSR$_1$ is formed. In the case where the group R contains an amino group, i. e. where a diamine such as p-phenylene diamine or benzidine is used a product which contains two —NHCSSR$_1$ groupings may be obtained so that a bis-tetrazole compound is formed.

The reaction to form the tetrazole compound is preferably effected in the presence of a solvent for the reactants which does not take part in the reaction. A suitable solvent is aqueous ethyl alcohol, though any other substantially inert solvent or solvent mixture may be used.

The following examples illustrate the invention:

EXAMPLE 1

1-methyl-5-mercapto-1.2.3.4-tetrazole 12.1 gm. of N-methyl dithiocarbamic acid methyl ester and 7 gm. of sodium azide were mixed in 30 cc. of ethyl alcohol and boiled under reflux. Water was added to the extent necessary to bring all the azide into solution (about 15 cc.). The solution was then boiled for 1 hour, methyl mercaptan being evolved, and was then cooled in ice and acidified with hydrochloric acid. A small amount of solid which precipitated was filtered off and rejected, and the filtrate was then concentrated to small bulk by heating on a water bath. On cooling, the 1-methyl-5-mercapto-1.2.3.4-tetrazole crystallised out and was filtered off, washed with water to remove sodium chloride, and dried. It was a white solid and had a melting point of 124° C.

EXAMPLE 2

1-phenyl-5-mercapto-1.2.3.4-tetrazole

The general procedure of Example 1 was followed using 1.0 gm. of methyl dithiocarbanilate, 0.5 gm. of sodium azide and 20 cc. of aqueous ethyl alcohol (80% ethyl alcohol). The product, after recrystallisation from ethyl alcohol, consisted of a white solid, melting point 155° C.

Example 3

1-cyclohexanyl-5-mercapto-1.2.3.4-tetrazole 9.0 gm. of N-cyclohexanyl dithiocarbamic acid methyl ester (prepared by reacting cyclohexylamine with carbon disulphide in alkali solution, treating the product while suspended in water with dimethyl sulphate and then, after making the mixture alkaline with ammonia, extracting the desired methyl ester with ether, evaporating the ether and drying the product), 4 gm. of sodium azide and 40 cc. of aqueous ethyl alcohol (80% ethyl alcohol) were refluxed together for 12 hours, then evaporated to half the bulk, cooled and diluted with water. The product separated as an oil which was extracted from the mixture with water and the water solution acidified, whereupon the desired tetrazole was precipitated. After washing with water and drying, it was obtained as a white solid, melting point 103° C.

Example 4

1-(o-methoxy-phenyl)-5-mercapto-1.2.3.4-tetrazole

The general procedure of Example 3 was followed using 6.5 gms. of N-(o-methoxy-phenyl) dithiocarbamic acid methyl ester, 3.0 gm. of sodium azide and 40 cc. of aqueous ethyl alcohol (80% ethyl alcohol), the reaction mixture being refluxed for five hours. After dilution with water, the reaction mixture was acidified, whereupon the desired product separated as a solid which, after washing with water and recrystallisation, was obtained as white needles, melting point 165° C. with decomposition.

Example 5

1-(p-chlor-phenyl)-5-mercapto-1.2.3.4-tetrazole

The general procedure of Example 4 was followed using 8 gms. of N-(p-chlor-phenyl)-dithiocarbamic acid methyl ester, 2.5 gm. of sodium azide and 40 cc. of aqueous ethyl alcohol (80% ethyl alcohol). Refluxing was continued for three hours. The product was obtained as a white crystalline solid, melting point 178° C.

Example 6

1-benzyl-5-mercapto-1.2.3.4-tetrazole 5 gm. of N-benzyl dithiocarbamic methyl ester, 2 gm. of sodium azide and 25 cc. of ethyl alcohol were refluxed together and 10 cc. of water added. The sodium azide dissolved and methyl mercaptan was evolved. After refluxing for five hours the solution was cooled and diluted with water. The small amount of oil which was precipitated was extracted with ether leaving an aqueous solution of the sodium salt of the tetrazole. This solution was acidified with concentrated hydrochloric acid, when the tetrazole was precipitated. A small ether layer which formed was allowed to evaporate. The tetrazole was then removed by filtration and the liquors evaporated to small bulk to obtain a second crop. The combined crops of tetrazole were recrystallised from solution in 50% aqueous ethyl alcohol to give the product as white crystalline flakes, melting point 144° C.

Example 7

1-α-naphthyl-5-mercapto-1.2.3.4-tetrazole 11.5 gm. of N-(α-naphthyl)-dithiocarbamic methyl ester and 5.0 gm. of sodium azide were refluxed together in aqueous ethyl alcohol solution for one hour. The solution was cooled, acidified, and the white precipitate filtered off. This on recrystallisation from dilute ethyl alcohol solution yielded the product, melting point 155–160° C., with decomposition.

Example 8

1-β-naphthyl-5-mercapto-1.2.3.4-tetrazole 5 gm. of N-(β-naphthyl)-dithiocarbamic methyl ester and 1.5 gm. of sodium azide were reacted as in Example 7, the white solid obtained being recrystallised from dilute ethyl alcohol to yield the product, melting point 172° C., with decomposition.

What I claim is:

1. Process for the production of alkali-metal salts of compounds of the general tautomeric formulae:

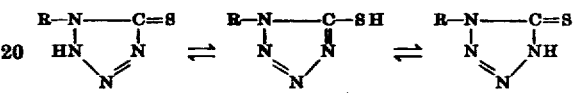

which comprises reacting a compound of the formula R.NH.CSSR₁ where R and R₁ are each a hydrocarbon nucleus, with an alkali metal azide.

2. Process for the production of compounds of the general tautomeric formulae:

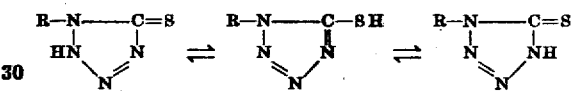

which comprises reacting a compound of the formula R.NH.CSSR₁ where R and R₁ are each a hydrocarbon nucleus, with an alkali metal azide, acidifying the resulting reaction mixture and separating the free tetrazole compound.

3. Process for the production of sodium salts of compounds of the general tautomeric formulae:

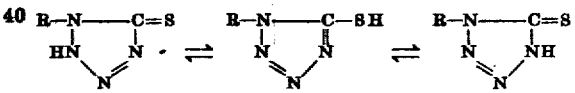

which comprises reacting a compound of the formula R.NH.CSSR₁ where R and R₁ are each a hydrocarbon nucleus, with a sodium azide.

4. Process for the production of compounds of the general tautomeric formulae:

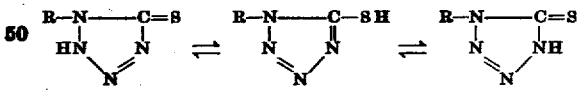

which comprises reacting a compound of the formula R.NH.CSSR₁ where R and R₁ are each selected from the group comprising substituted and unsubstituted hydrocarbon groups, with a sodium azide, acidifying the resulting reaction mixture and separating the free tetrazole compound.

5. Process for the production of alkali-metal salts of compounds of the general tautomeric formulae:

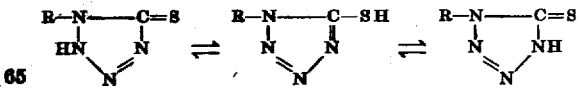

which comprises reacting a compound of the formula R.NH.CSSR₁ where R₁ is a lower alkyl group and R is a hydrocarbon nucleus, with an alkali metal azide.

6. Process for the production of compounds of the general tautomeric formulae:

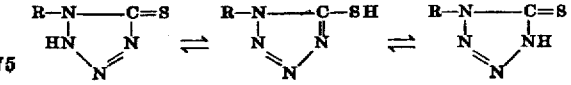

which comprises reacting a compound of the formula R.NH.CSSR₁ where R₁ is a lower alkyl group and R is a hydrocarbon nucleus, with an alkali metal azide, acidifying the resulting reaction mixture and separating the free tetrazole compound.

7. Process for the production of alkali-metal salts of compounds of the general tautomeric formulae:

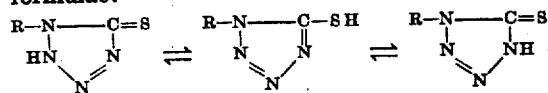

which comprises reacting a compound of the formula R.NH.CSSR₁ where R₁ is a methyl group and R is a hydrocarbon nucleus, with an alkali metal azide.

8. Process for the production of compounds of the general tautomeric formulae:

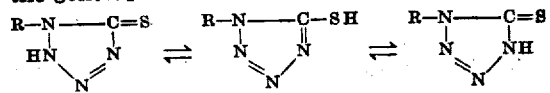

which comprises reacting a compound of the formula R.NH.CSSR₁ where R₁ is a methyl group and R is a hydrocarbon nucleus, with an alkali metal azide, acidifying the resulting reaction mixture and separating the free tetrazole compound.

9. Process for the production of alkali-metal salts of compounds of the general tautomeric formulae:

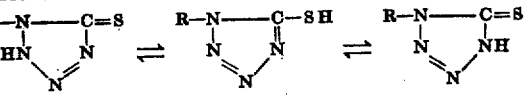

which comprises reacting a compound of the formula R.NH.CSSR₁ where R₁ is a lower alkyl group and R is a naphthyl group, with an alkali metal azide.

10. Process for the production of compounds of the general tautomeric formulae:

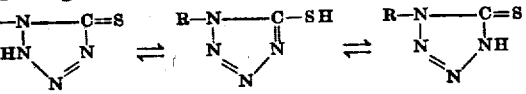

which comprises reacting a compound of the formula R.NH.CSSR₁ where R₁ is a lower alkyl group and R is a naphthyl group, with an alkali metal azide, acidifying the resulting reaction mixture and separating the free tetrazole compound.

JOHN DAVID KENDALL.

---

CERTIFICATE OF CORRECTION.

Patent No. 2,386,869.  October 16, 1945.

JOHN DAVID KENDALL.

It is hereby certified that error appears in the printed specification of the above numbered patent requiring correction as follows: Page 2, second column, lines 54 to 56 inclusive, strike out "selected from the group comprising substituted and unsubstituted hydrocarbon groups" and insert instead --a hydrocarbon nucleus--; and that the said Letters Patent should be read with this correction therein that the same may conform to the record of the case in the Patent Office.

Signed and sealed this 29th day of January, A. D. 1946.

Leslie Frazer (Seal)  First Assistant Commissioner of Patents.

which comprises reacting a compound of the formula $R.NH.CSSR_1$ where $R_1$ is a lower alkyl group and R is a hydrocarbon nucleus, with an alkali metal azide, acidifying the resulting reaction mixture and separating the free tetrazole compound.

7. Process for the production of alkali-metal salts of compounds of the general tautomeric formulae:

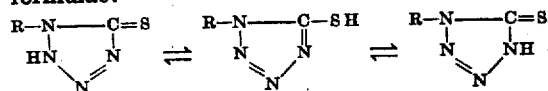

which comprises reacting a compound of the formula $R.NH.CSSR_1$ where $R_1$ is a methyl group and R is a hydrocarbon nucleus, with an alkali metal azide.

8. Process for the production of compounds of the general tautomeric formulae:

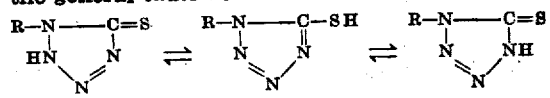

which comprises reacting a compound of the formula $R.NH.CSSR_1$ where $R_1$ is a methyl group and R is a hydrocarbon nucleus, with an alkali metal azide, acidifying the resulting reaction mixture and separating the free tetrazole compound.

9. Process for the production of alkali-metal salts of compounds of the general tautomeric formulae:

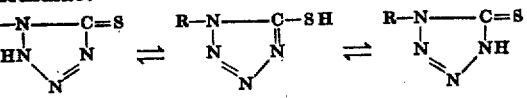

which comprises reacting a compound of the formula $R.NH.CSSR_1$ where $R_1$ is a lower alkyl group and R is a naphthyl group, with an alkali metal azide.

10. Process for the production of compounds of the general tautomeric formulae:

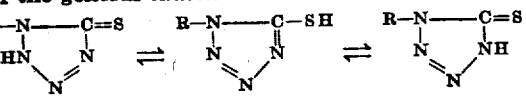

which comprises reacting a compound of the formula $R.NH.CSSR_1$ where $R_1$ is a lower alkyl group and R is a naphthyl group, with an alkali metal azide, acidifying the resulting reaction mixture and separating the free tetrazole compound.

JOHN DAVID KENDALL.

---

CERTIFICATE OF CORRECTION.

Patent No. 2,386,869.    October 16, 1945.

JOHN DAVID KENDALL.

It is hereby certified that error appears in the printed specification of the above numbered patent requiring correction as follows: Page 2, second column, lines 54 to 56 inclusive, strike out "selected from the group comprising substituted and unsubstituted hydrocarbon groups" and insert instead --a hydrocarbon nucleus--; and that the said Letters Patent should be read with this correction therein that the same may conform to the record of the case in the Patent Office.

Signed and sealed this 29th day of January, A. D. 1946.

Leslie Frazer

First Assistant Commissioner of Patents.

(Seal)